United States Patent
Babutzka et al.

(10) Patent No.: US 7,516,458 B2
(45) Date of Patent: Apr. 7, 2009

(54) JOB MANAGEMENT IN PRESENCE OF IMPLICIT DEPENDENCY

(75) Inventors: Dieter Babutzka, Muehlhausen-Rettigheim (DE); Hans-Georg Klotzek, Wiesloch (DE)

(73) Assignee: SAP Aktiengesellschaft, Walldorf (DE)

( * ) Notice: Subject to any disclaimer, the term of this patent is extended or adjusted under 35 U.S.C. 154(b) by 830 days.

(21) Appl. No.: 10/210,196

(22) Filed: Jul. 31, 2002

(65) Prior Publication Data

US 2004/0025163 A1    Feb. 5, 2004

(51) Int. Cl.
    G06F 9/46    (2006.01)
(52) U.S. Cl. ...................... 718/106; 718/102
(58) Field of Classification Search ............... 718/102, 718/104, 106
    See application file for complete search history.

(56) References Cited

U.S. PATENT DOCUMENTS

| | | | | |
|---|---|---|---|---|
| 5,329,626 | A * | 7/1994 | Klein et al. | 709/248 |
| 5,812,811 | A * | 9/1998 | Dubey et al. | 712/216 |
| 6,289,368 | B1 * | 9/2001 | Dentler et al. | 718/101 |
| 6,430,590 | B1 * | 8/2002 | Fischer | 718/100 |
| 6,584,487 | B1 * | 6/2003 | Saboff | 718/100 |
| 2001/0005853 | A1 * | 6/2001 | Parkes et al. | 709/106 |
| 2003/0120710 | A1 * | 6/2003 | Pulsipher et al. | 709/106 |
| 2003/0149717 | A1 * | 8/2003 | Heinzman | 709/101 |
| 2005/0005272 | A1 * | 1/2005 | Moody et al. | 718/104 |
| 2006/0010425 | A1 * | 1/2006 | Willadsen et al. | 717/120 |

FOREIGN PATENT DOCUMENTS

| | | |
|---|---|---|
| EP | 1011045 A2 | 6/2000 |
| EP | 2 355 319 | 4/2001 |

OTHER PUBLICATIONS

Hoegel, Hubert; "GPC—A Job Scheduler (not only) For Radar Image Processing"; *German Aerospace Center*; Sep. 11, 1998; pp. 1-11.
Search Report, EPO, Application No. 02017040.3-1243, dated Mar. 26, 2003, 3 pages.
Communication Pursuant to Article 96(2) EPC, EPO, Application No. 02017040.3-1243, dated Nov. 24, 2004, 7 pages.
Summons to Attend Oral Proceedings Pursuant to Rule 71(1) EPC, EPO, Application 02017040.3-1243, dated Nov. 30, 2007, 6 pages.
Summons to Attend Oral Proceedings Pursuant to Rule 115(1) EPC, EPO, Application No. 02017040.3-1243, dated Jan. 9, 2008, 6 pages.

* cited by examiner

*Primary Examiner*—Meng-Ai An
*Assistant Examiner*—Nathan Price
(74) *Attorney, Agent, or Firm*—Fish & Richardson P.C.

(57) ABSTRACT

Methods, systems, and computer program products for job management in the presence of implicit dependency. In a situation where static dependency exists between a first computer job and a second computer job as an initial start condition for the second job, where the start of the second job depends on the completion of the first job, a scheduler determines whether the first job has created a child job, in which case the initial start condition is changed into an adjusted start condition by adding an implicit dependency, whereby the start of the second job is made further to depend at least on the completion of the child job.

26 Claims, 3 Drawing Sheets

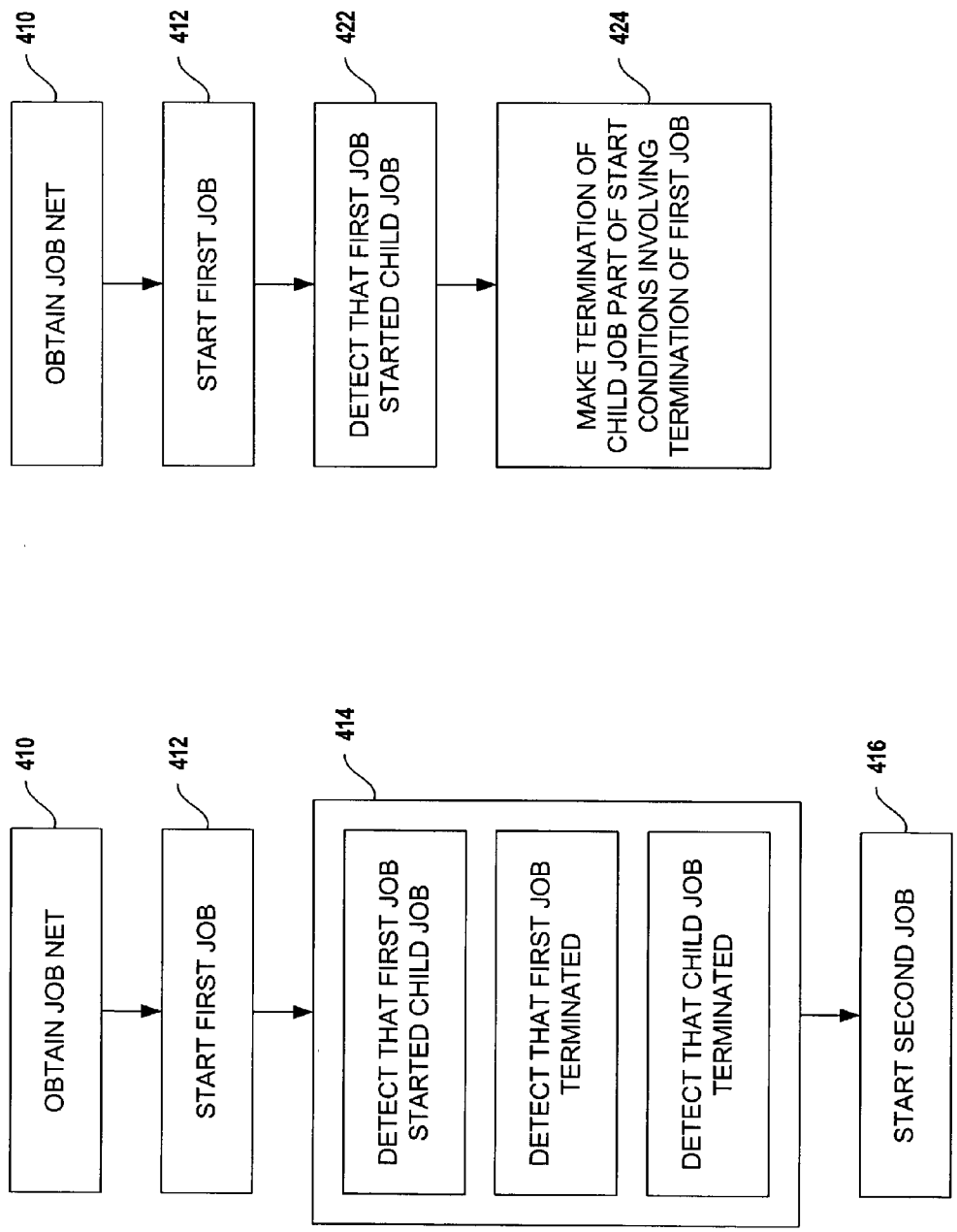

JOB MANAGEMENT IN PRESENCE OF IMPLICIT DEPENDENCY

BACKGROUND

The present invention relates to job management in one or more computer systems.

Computer installations often include multiple computer systems, at one or multiple physical sites. A computer installation generally has tasks that are run without user interaction. Examples of such tasks are a system backup or a payroll run in an Enterprise Resource Planning ("ERP") system. These tasks are usually performed as background or batch jobs (which in this specification will also be referred to simply as a "jobs"). Jobs are generally scheduled with a certain start condition (e.g., start time), and, if the start condition is fulfilled, the jobs are started automatically without user interaction. To avoid slowing down system responses for users, jobs are typically run when the system has a low user interaction load.

A task may be performed by multiple jobs. For example, a complex payroll run in an ERP system can be split up into hundreds of jobs. Dependencies can exist between or among these jobs, where the one or more jobs should not be started until the completion of one or more other jobs, or where jobs should not be started until necessary input data has been prepared. Dependencies that necessarily arise will be referred to as static dependencies.

Typically, a job scheduler (which will be referred to simply as a scheduler) for managing jobs uses a job sequence that defines start conditions for each job and defines interdependencies between various jobs, even across multiple computers. This information may come from local job administration programs (e.g., batch control processors) of the various computers.

A problem can occur when a first job starts a child job and the start of a second job is implicitly dependent on the successful completion of the child job. The child job may have been created for the purpose of dynamically distributing workload. Some schedulers will start the second job when the first job is completed but before the child job completed successfully, which can then lead to a failure of the second job.

When jobs are started on multiple computer systems communicating over a network, a scheduler can be used to coordinate the start of each job throughout the whole computer installation.

SUMMARY OF THE INVENTION

The present invention provides methods and apparatus, including computer program products, for job management in the presence of implicit dependencies.

In general, in one aspect, the invention provides methods and apparatus, including computer program products, for job management in the presence of child jobs. A method includes the acts of establishing a static dependency between a first job and a second job as an initial start condition for the second job, whereby the start of the second job depends on the completion of the first job; starting the first job; determining whether the first job has created at least one child job; and changing the initial start condition into an adjusted start condition for the second job by adding an implicit dependency on the at least one child job, if the first job has created at least one child job, whereby the start of the second job is made further to depend at least on the completion of the at least one child job.

In general, in another aspect, the invention provides methods and apparatus, including computer program products, for job management in a computer installation where a static dependency exists between a first job and a second job as an initial start condition for the second job, whereby the start of the second job depends on the completion of the first job. One such method includes the acts of starting the first job using a local job administration program; and sending status information about the first job from the local job administration program to a scheduler, the status information indicating that the first job has created at least one child job, to enable the scheduler to change the initial start condition for the second job into an adjusted start condition for the second job by adding an implicit dependency so that the start of the second job is made further to depend at least on the completion of the at least one child job.

In general, in another aspect, the invention provides a system for managing jobs. The system includes a data store that includes representations of jobs and dependencies, including representations of child jobs and implicit dependencies; computer program instructions for tracking a current status of jobs and for updating the representations to reflect the current status of jobs; and computer program instructions for preventing the start of a second job when the data store indicates that the second job implicitly depends on a first job that is not completed.

The invention can be implemented to realize one or more of the following advantages. A system in accordance with the invention includes a scheduler that tracks jobs and dependencies, including child jobs and implicit dependencies. By learning of a child job that is launched by a first job, the scheduler can prevent failure of a second job that implicitly depends on the completion of the child job. The scheduler can delay the start of the second job until all relevant input data is created by the first job and its child jobs. In a computer system with multiple computers, the scheduler can prevent failure of a job in one computer, even if the job depends on the completion of a child job running in another computer of the computer system. Similarly, in a computer installation with distributed computer systems, the scheduler can prevent failure of a job in one computer system, even if the job depends on the completion of a child job running in another computer system.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIG. 3 is a flow chart showing a method for job management in one implementation of the invention.

FIG. 4 is a flow chart showing an alternative method for job management in one implementation of the invention.

Like reference symbols in the various drawings indicate like elements.

DETAILED DESCRIPTION

Figure 1:
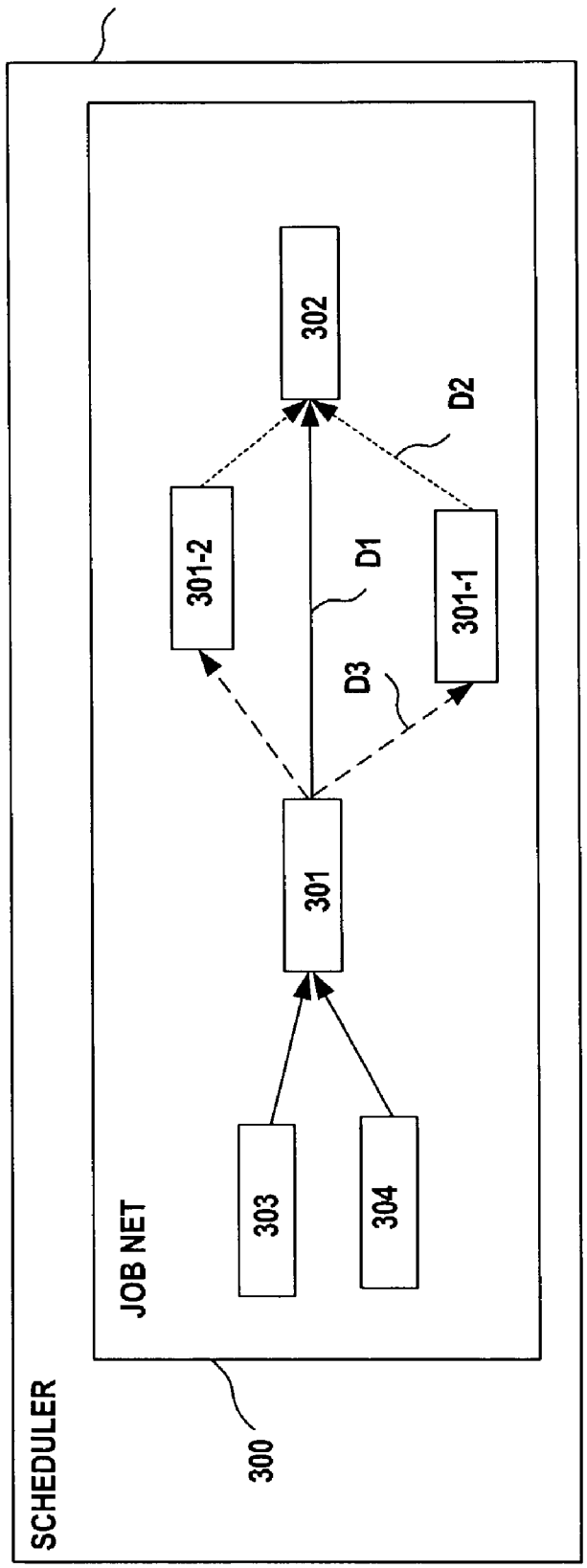
FIG. 1 is a block diagram illustrating a job net and a scheduler in one implementation of the invention.

FIG. 1 illustrates an implementation of a job net 300 in a scheduler 100 in accordance with the invention. The scheduler can be implemented and run on any computer in a computer installation. The job net 300 includes representations of jobs to be executed in a computer system and defines the sequence of jobs by having a start condition for each job. A start condition can include dependencies on various jobs across multiple computers and computer systems that communicate over a network. The scheduler 100 is a computer program or program component that causes jobs to be started on appropriate computers or computer systems based on the job net 300.

In the example shown in FIG. 1, the job net 300 represents jobs 301, 302, 303, and 304 and child jobs 301-1 and 301-2. The actual internal representation of the job net 300 can use any convenient data structure.

The job net 300 can represent static, dynamic, and implicit dependencies. In FIG. 1, a static dependency is illustrated using a straight solid arrow. Static dependency D1, for example, indicates that starting the second job 302 depends on the successful completion of the first job 301. Further static dependencies are shown between first job 301 and further jobs 303 and 304. The dependency can define a completion to be successful even if some error occurred, if the error is not of a kind that compromises downstream jobs.

In FIG. 1, a dynamic dependency is illustrated using a dashed arrow. Dynamic dependency D3 indicates that child job 301-1 is dynamically dependent on first job 301. In other words, child job 301-1 is not represented in the static part of job net 300, but it was added dynamically because it was initiated by first job 301 rather than by the scheduler. Note that child jobs need not be represented in the job net 300 at the time they are created. The scheduler 100 might learn about them at some substantially later time, when, for example, status information about the first job 301 is obtained after the first job terminates.

In FIG. 1, an implicit dependency is illustrated using a dotted arrow. For example, implicit dependency D2 indicates that the second job 302 implicitly depends on the successful completion of the child job 301-1. A dependency is implicit where the dependency on a child job is not represented in the static part of a job net and arises from the creation of the child job by a parent job, which may itself be a child job of another job, and where there is a dependency on the parent job. Note that in addition to depending on the child job 301-1, the second job 302 also depends on the completion of the first job 301. Because of these dependencies, the scheduler will not start the second job 302 until both the first job 301 and the child job 301-1 are completed.

A scheduler can run on the computer system where the jobs to be scheduled will run, or it can run on a computer external to some or all of the computer systems on which the jobs to be scheduled will run.

Figure 2:
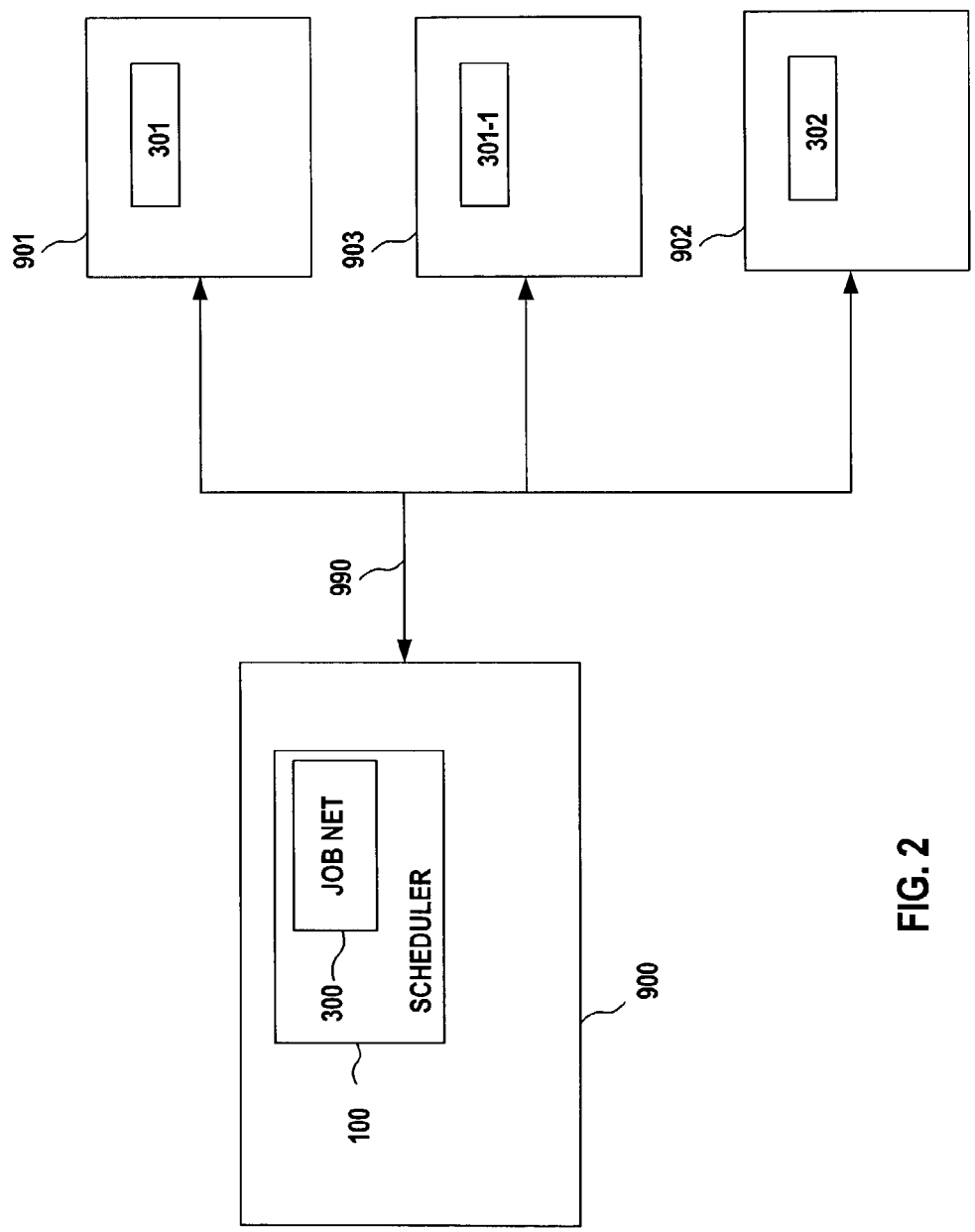
FIG. 2 is a block diagram illustrating interactions of the job net and the scheduler with a computer system.

FIG. 2 illustrates an example scenario in a computer installation that includes computers 900, 901, 902 and 903 that communicate through a network 990. The scheduler 100 with the job net 300 is running in computer 900. In this scenario, the scheduler 100 started a first job 301 on computer 901. It did so by using the operating system or other facilities available for job management on computer 901. The first job 301 started a child job 301-1 on another computer, namely computer 903, without the involvement of the scheduler 100. Having started job 301 and knowing from the job net 300 that the successful completion of job 301 is a condition for the starting of job 302, the scheduler 100 monitors the status of job 301 on computer 901, again by using the facilities of computer 901. When job 301 terminates, the scheduler 100 obtains, or has obtained, the following information from computer 901: (i) whether or not job 301 terminated successfully, and (ii) whether or not job 301 started any child jobs, and, if so, the unique identity and the location (which may be remote from job 301) of those child jobs. The scheduler obtains the same information concerning all child jobs, until all the descendents of job 301 have terminated. The scheduler can do this by requesting periodically for each job it starts, and for each child job it discovers, a job list from a job control process on the computer system on which the job in question is started, where the job list for a job identifies its child jobs, providing for each a unique identifier. Using this information, the scheduler can obtain from the batch control process of each affected computer system the status of the jobs in question, and obtain further job lists, until all descendents have terminated and all required status information has been obtained.

In alternative implementations, the scheduler 100 registers on all appropriate computers for notification of events related to jobs that the scheduler 100 has scheduled, and through such notifications receives information relating the termination of scheduled jobs, the initiation by scheduled jobs of child jobs, the initiation of further child jobs by such child jobs, and the terminations of all of them.

In the scenario illustrated in FIG. 2, the scheduler 100 learns that job 301 started child job 301-1 on computer 903. The scheduler 100 infers from this information the dynamic dependency D3 (FIG. 1) between job 301 and child job 301-1 and determines that there is an implicit dependency D2 (FIG. 1) between child job 301-1 and the second job 302. The implicit dependency means that a further condition exists for starting the second job 302, namely, the successful termination of the child job 301-1. When the start condition is fulfilled, e.g., when the first job 301 and the child job 301-1 terminate successfully, the scheduler 100 can start the second job 302. The second job can be started on yet another computer 902.

In implementations where jobs and child jobs are run on multiple computers, the scheduler 100 will be a network scheduler that can manage dependencies of jobs and child jobs running on different computers. The managed dependencies can be static, dynamic, or implicit. By evaluating complex start conditions involving multiple computers, the network scheduler can delay the start of a dependent job until a corresponding start condition is fulfilled.

FIG. 3 shows a method performed by a scheduler in accordance with the invention. Before scheduling any jobs, the scheduler obtains a job net (step 410). The scheduler can obtain the job net by reading a data file from a local or remote file system, by reading records from a database, by receiving data input by a user at a command line or graphical user interface, by receiving the information from local job administration programs (e.g., batch control processors) of the one or more computers that execute the jobs, or by any combination of these or other means of obtaining information.

Initially, the dependencies represented in the job net will all be static.

When the start conditions for a first job are satisfied, the scheduler starts the first job (step 412) and all other jobs as their start conditions are satisfied. (It will be understood that conditions external to the scheduler—e.g., the availability of computer resources—may affect whether jobs are actually started when the scheduler starts them, but for present purposes one can ignore the difference between the scheduler requesting that a job be started and the job actually being started.)

For each job from which another job depends—i.e., for each job where the outcome of the job is a factor in a condition for the starting of another job—the scheduler detects whether the job has terminated and in what condition—e.g., whether the job terminated successfully—and the scheduler further detects whether the job has initiated any child jobs and, if so, whether all these child jobs have terminated (step 414). As mentioned earlier, the scheduler detects this information by checking the status of jobs on the computer or computers on which jobs have been started, or by receiving notifications from that computer or those computers.

When the scheduler detects that both the first job and all its child jobs have terminated successfully, or terminated with whatever termination condition is required to start a second job, the scheduler starts the second job (step 416).

FIG. 4 illustrates a slightly different implementation of the invention, in which the creation of a child job by a first job is detected (step 422) and as a consequence, all start conditions that involve the first job are changed so that the condition on the first job becomes a condition on both the first job and the child job (step 424).

As a final example, how a scheduler interacts with a local administration program in one implementation of the invention will now be described with reference to a simple scenario. The scheduler starts a first job on first computer. A second job is dependent on the first job. The first job creates a child job, which can be executed by any computer. The scheduler periodically (e.g., every minute, every 10 minutes or every hour, dependent on the type of job) sends requests to each computer in the computer installation to retrieve the status of jobs. This information can be requested by polling a local job administration program on each computer, which will know what jobs have been started and what jobs have been completed, and in particular, what child jobs have been created by what parent jobs. In response, the local administration program generates status information about the first job that includes information about any child jobs created by the first job. For example, a batch control processor can generate a list of child jobs that includes a job identifier, such as a unique job name and sequence number, to distinguish instances of jobs of the same name. Further information, such as an identifier of the computer where a child job was created, can be included in the status information.

Once the scheduler has this information, it changes, in effect, the initial start condition for second job into an adjusted start condition, so that the second job is implicitly dependent on the child jobs of the first job, whether those child jobs are direct or indirect (i.e., directly created by the first job, or created by some child job). Because the scheduler knows of the existence of the child jobs, it obtains status information about each child job from the corresponding local job administration program (e.g., batch control processor).

In an alternative implementation, local job administration programs automatically send to the scheduler the status of the first job and of any of child jobs after completion of the first job. The scheduler does not need to know of the creation of child jobs until it learns of the termination of their parent job. The scheduler then requests the same kind of notification from the local job administration program of each system on which a child job was started.

Once the status of child jobs indicates the completion of the child jobs and the status of first job indicates the completion of the first job, the adjusted start condition of second job is fulfilled and the scheduler can start the second job.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks and removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computers and computer systems of the installation can be interconnected by any form or medium of digital data communication. Examples of communication networks include a local area network ("LAN") or a wide area network ("WAN"), e.g., the Internet.

The invention has been described in terms of particular embodiments. Other embodiments are within the scope of the following claims. For example, the steps of the invention can be performed in a different order and still achieve desirable results. The representations of the jobs and dependencies can be data objects.

What is claimed is:

1. A computer-implemented method, comprising:
    receiving in a scheduler an initial definition of dependencies between jobs, the initial dependencies including a static dependency between a first job and a second job as an initial start condition for the second job, the static dependency specifying that the start of the second job depends on the completion of the first job;

starting the first job by action of the scheduler after the receiving of the initial definition of dependencies;

receiving an indication of completion of the started first job and an indication of an execution of at least one child job dynamically created by the started first job without being initiated by action of the scheduler;

detecting, at the scheduler, a unique identifier of the at least one child job, the at least one child job not being represented in the initial definition of dependencies between jobs or in any dependency in the initial definition of dependencies between jobs, and the child job completing after the started first job completes;

if the scheduler detects that the started first job has created the at least one child job, changing the initial start condition into an adjusted start condition for the second job by adding an implicit dependency on the at least one child job to the definition of dependencies, the implicit dependency specifying that the start of the second job is made further to depend at least on the completion of the at least one child job;

receiving an indication of completion of the at least one child job; and executing the second job in response to at least the indication of completion of the at least one child job.

2. The method of claim 1, wherein:

in the initial start condition, the start of the second job depends on an error-free completion of the first job; and in the adjusted start condition, the start of the second job depends on an error-free completion of the child job.

3. The method of claim 1, further comprising:

dynamically adding a dynamic dependency between the started first job and the child job, the dynamic dependency indicating that the child job is dynamically dependent on the started first job;

receiving status information about the started first job by polling computers in a computer installation; and determining whether the started first job has created a child job by evaluating the received status information.

4. The method of claim 1, further comprising:

receiving status information about the started first job by receiving notifications from computers in a computer installation; and detecting that the started first job has created a child job by evaluating the received status information.

5. The method of claim 1, further comprising:

starting the second job when the adjusted start condition is satisfied.

6. The method of claim 1, wherein the first job is started on a first computer and the second job is started on a distinct second computer.

7. The method of claim 6, wherein:

detecting that the started first job has created a child job comprises detecting that the started first job has created a child job on a distinct third computer.

8. The method of claim 1, wherein:

the first job is started on a first computer; and detecting that the started first job has created a child job comprises detecting that the started first job has created a child job on a distinct second computer.

9. A method for job management in a computer installation where a static dependency exists between a first job and a second job as an initial start condition for the second job so that the start of the second job depends on the completion of the first job, the method comprising:

starting the first job using a local job administration program; and sending status information about the started first job from the local job administration program to a scheduler, the status information indicating a unique identifier of a child job dynamically created by the first job without being initiated by action of the local job administration program or the scheduler, the child job not being represented in a static dependency as part of an initial start condition for the second job and the child job completing after the started first job completes, to enable the scheduler to change the initial start condition for the second job into an adjusted start condition for the second job by adding an implicit dependency to the initial start condition of the second job so that the start of the second job is made further to depend at least on the completion of the child job.

10. The method of claim 9, wherein:

in the initial start condition, the start of the second job depends on an error-free completion of the started first job; and in the adjusted start condition, the start of the second job depends on an error-free completion of the child job.

11. The method of claim 9, wherein the local job administration program is running on a first computer, the method further comprising:

sending the status information to a scheduler running on a distinct second computer.

12. A system for managing jobs, the system comprising:

a processor operable to execute computer program instructions;

a data store that includes a representation of jobs including child jobs and dependencies including static dependencies and implicit dependencies, the representation having an initial state, the static dependencies being those dependencies that are represented in the initial state of the representation;

computer program instructions for tracking a current status of jobs and for updating the representation to reflect the current status of jobs, including the status of jobs that are started by other jobs and not by the system for managing jobs; and computer program instructions using the representation to avoid starting a second job when the data store indicates that the second job has an implicit dependency on a uniquely identified first job that is not completed, the implicit dependency being a dependency that arose from the dynamic creation of the first job by a started parent job without being initiated by action of the system for managing jobs, the creation of the first job not being represented by any of the static dependencies, the first job not being represented in the initial representation of jobs and dependencies, the first job not being included in any dependency in the initial representation of jobs and dependencies, and the first job completing after the started parent job completes; the indication of the implicit dependency of the second job on the first job being added to the dependencies included in the data store after the creation of the first job by the parent job, the implicit dependency indicating a start condition so that the start of the second job is made to depend, at least in part, on the completion of the first job.

13. The system of claim 12, wherein:

the first job is scheduled to be run on a first computer; and the second job is scheduled to be run on a distinct second computer.

14. A computer program product, tangibly embodied in a machine-readable storage device, for job management in the presence of child jobs, the computer program product comprising instructions operable to cause data processing apparatus to:

receive in a scheduler an initial definition of dependencies between jobs, the initial dependencies including a static dependency between a first job and a second job as an initial start condition for the second job, the static dependency specifying that the start of the second job depends on the completion of the first job;

start the first job by action of the scheduler after the initial definition of dependencies is received;

receive an indication of completion of the started first job and an indication of an execution of at least one child job dynamically created by the started first job without being initiated by action of the scheduler;

detect, at the scheduler, a unique identifier of at least one child job, the at least one child job not being represented in the initial definition of dependencies between jobs or in any dependency in the initial definition of dependencies between jobs, and the child job completing after the started first job completes;

change the initial start condition into an adjusted start condition for the second job by adding an implicit dependency on the at least one child job to the definition of dependencies, if the scheduler detects that the started first job has created the child job, the implicit dependency specifying that the start of the second job is made further to depend at least on the completion of the at least one child job;

receive an indication of completion of the at least one child job; and execute the second job in response to at least the indication of completion of the at least one child job.

15. The computer program product of claim 14, wherein:
in the initial start condition, the start of the second job depends on an error-free completion of the started first job; and
in the adjusted start condition, the start of the second job depends on an error-free completion of the at least one child job.

16. The computer program product of claim 14, further comprising instructions to:
dynamically add a dynamic dependency between the started first job and the child job, the dynamic dependency indicating that the child job is dynamically dependent on started first job;
receive status information about the started first job by polling computers in a computer installation; and
determine whether the started first job has created a child job by evaluating the received status information.

17. The computer program product of claim 14, further comprising instructions to:
receive status information about the started first job by receiving notifications from computers in a computer installation; and
detect that the started first job has created a child job by evaluating the received status information.

18. The computer program product of claim 14, further comprising instructions to:
start the second job when the adjusted start condition is satisfied.

19. The computer program product of claim 14, wherein the started first job is started on a first computer and the second job is started on a distinct second computer.

20. The computer program product of claim 19, wherein:
instructions to detect that the first job has created a child job comprises instructions to detect that the started first job has created at least one child job on a distinct third computer.

21. The computer program product of claim 14, wherein:
the first job is started on a first computer; and
instructions to detect that the started first job has created a child job comprise instructions to detect that the started first job has created a child job on a distinct second computer.

22. A computer program product, tangibly embodied in a machine-readable storage device, for job management in a computer installation where a static dependency exists between a first job and a second job as an initial start condition for the second job, so that the start of the second job depends on the completion of the first job, the computer program product comprising instructions operable to cause data processing apparatus to:

start the first job using a local job administration program; and send status information about the first job from the local job administration program to a scheduler, the status information indicating a unique identifier of a child job dynamically created by the started first job without being initiated by action of the local job administration program or the scheduler, the child job not being represented in a static dependency as part of an initial start condition for the second job and the child job completing after the started first job completes, to enable the scheduler to change the initial start condition for the second job into an adjusted start condition for the second job by adding an implicit dependency to the initial start condition of the second job so that the start of the second job further depends on the completion of the child job.

23. The computer program product of claim 22, wherein:
in the initial start condition, the start of the second job depends on an error-free completion of the started first job; and
in the adjusted start condition, the start of the second job depends on an error-free completion of the at least one child job.

24. The computer program product of claim 22, further comprising instructions to:
start the first job using a local job administration program on a first computer; and
send the status information to a scheduler running on a distinct second computer.

25. A computer program product, tangibly embodied in a machine-readable storage device, for managing jobs, the computer program product comprising instructions operable to cause data processing apparatus to:

establish a representation of jobs including child jobs and dependencies including static dependencies and implicit dependencies, the representation having an initial state, the static dependencies being dependencies represented in the initial state of the representation;

track current status of jobs and update the representation to reflect the current status of jobs, including the status of dynamically-created jobs that are started by other started jobs without being initiated by action of the program product for managing jobs, the dynamically-created jobs not being represented in the initial state of the representation;

detect the creation of dynamically-created jobs and, as a consequence, change all start conditions that involve a parent job of a dynamically-created job so that the condition on the respective parent job becomes a condition on both the respective parent job and the dynamically-created job; and use the representation to avoid starting a second job when the representation indicates that the second job has an implicit dependency on a uniquely identified first job that is not completed, the implicit dependency being a dependency that arose from the dynamic creation of the first job by a parent job and not by the program product for managing jobs, the dynamic creation of the first job not being represented in the initial state of the representation or by any of the static dependencies, and the first job completing after the parent job completes.

26. The computer program product of claim 25, further comprising instructions to:

cause the first job to be run on a first computer; and
cause the second job be run on a distinct second computer.

* * * * *